UNITED STATES PATENT OFFICE.

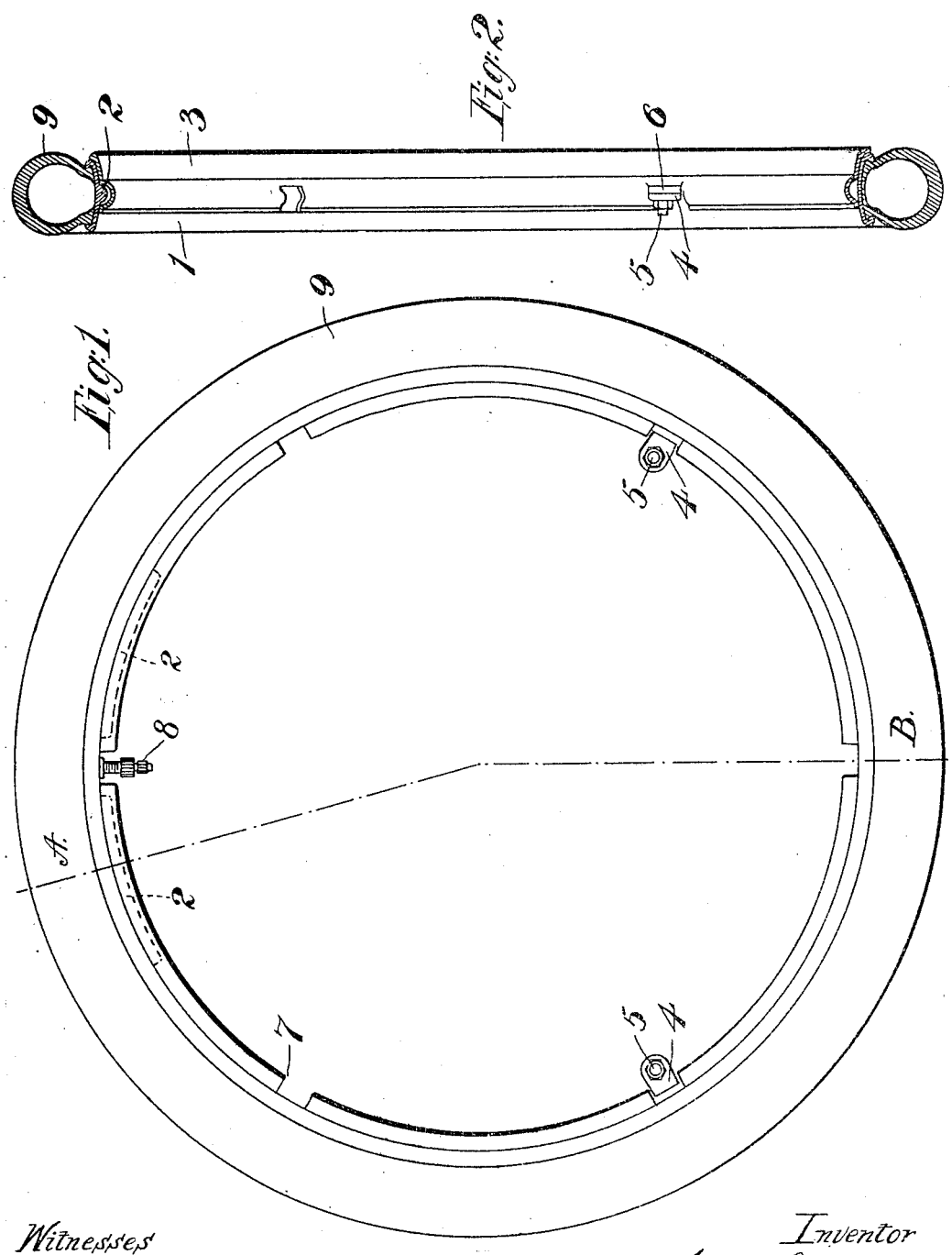

JAMES CRAIG, OF BEDFORD, ENGLAND.

DEMOUNTABLE RIM 1,085,324. Specification of Letters Patent. Patented Jan. 27, 1914.

Application filed September 28, 1912. Serial No. 722,886.

*To all whom it may concern:*

Be it known that I, JAMES CRAIG, a subject of the King of Great Britain, residing at 82 Ampthill road, Bedford, England, have invented a new and useful Improved Demountable Rim, of which the following is a specification.

The invention consists in a motor vehicle wheel, a tire containing rim with one or more ridges on its inner surface and arranged in the central plane of the wheel and adapted to engage in one or more central recesses formed in the fixed rim when the tire carrying rim is placed in position.

The invention more particularly defined, consists of locking members mounted upon the tire carrying rim for securing said rim to the fixed rim.

The invention still further consists in the construction, combination and arrangement of parts whereby the above-named objects and certain other objects hereinafter appearing are obtained.

The invention is described by way of example with reference to the accompanying drawings in all the figures of which the same reference characters indicate corresponding parts and in which—

Figure 1 shows a side view with the detachable rim in position and Fig. 2 shows a section on the line A—B of Fig. 1.

Referring now to the drawings, on the inner surface of the detachable rim 1 I mount one or more ridges 2, preferably semi-circular in form. In Fig. 1 of the drawings, I illustrate in dotted lines the use of a pair of ridges. The said ridges 2 are arranged in the central plane of the wheel and are adapted to engage in the central recess formed in the fixed rim 3 of the wheel, as shown in Fig. 2. In suitable positions on said detachable rim I arrange lugs 4 provided with circular holes adapted to receive the ends of set screws 5 projecting laterally from corresponding lugs 6 mounted on the inner side of the fixed rim of the wheel.

In order to place the detachable rim in position on the car wheel the projecting ridges 2 on its inner surface are first placed in the recess formed in the fixed rim of the wheel 3 and the diametrically opposite side of said detachable rim is then pushed over the felly until its lugs 4 engage with the corresponding lugs 6 fastened on the car wheel. Finally, the nuts on the set screws 5 can then be screwed up and the detachable rim fastened to the car wheel.

I prefer to arrange in the fixed rim 3 a series of recesses 7 conveniently four in number, adapted to respectively receive the valve 8 of the tire 9 and three security bolts, not shown, by which the means of connecting the detachable rim with the fixed rim are strengthened.

What I claim is—

In a demountable motor vehicle wheel rim, the combination of a wheel with a fixed rim slotted at intervals to take security bolts and the valve stem and to allow of circumferential sliding relatively to the latter, a central recess in said fixed rim, a detachable tire carrying rim formed of a shape and size to fit upon said fixed rim, a pair of engaging ridges of semi-circular cross section on each side of the tire valve stem and integral with the inner surface and in the central plane of said detachable rim and adapted to engage in said central recess in the fixed rim and lugs projecting from the detachable rim with circular holes adapted to receive the ends of set screws forming security bolts projecting laterally from corresponding lugs mounted on the fixed rim of the wheel.

In testimony whereof I have signed my name to the specification in the presence of two subscribed witnesses.

JAMES CRAIG.

Witnesses:
O. C. PALMER,
LEONARD E. HAYNES.